March 21, 1961 J. P. DOELGER ET AL 2,975,800
INTERNAL-CYLINDER-OPERATED VALVE
Filed Feb. 17, 1958 3 Sheets-Sheet 2

Inventors.
John P. Doelger, &
Richard Fennema.
By Joseph O. Lange Atty

March 21, 1961 J. P. DOELGER ET AL 2,975,800
INTERNAL-CYLINDER-OPERATED VALVE
Filed Feb. 17, 1958 3 Sheets-Sheet 3

Inventors.
John P. Doelger, &
Richard Fennema.
By Joseph O. Lange
Atty.

United States Patent Office

2,975,800
Patented Mar. 21, 1961

2,975,800

INTERNAL-CYLINDER-OPERATED VALVE

John P. Doelger and Richard Fennema, Chicago, Ill., assignors to Crane Co., Chicago, Ill., a corporation of Illinois Filed Feb. 17, 1958, Ser. No. 715,719

4 Claims. (Cl. 137—565)

The present invention relates to a novel internal-cylinder-operated valve, or in other words a cylinder-operated valve incorporating the operator within the valve body.

The invention provides a solution to the problems consequent on a continuing trend in many industries, in various processes and operations involving the employment of fluids under pressure, toward the use of ever-increasing pressures. One example is boilers in power plants, for instance, which now use much higher feed water pressures than formerly. A problem arises in providing valves for control of the flow of such high-pressure fluids which can develop the thrust necessary for tight closing against the high pressures, particularly in the larger sizes of valves. In some cases, even the largest electric motor operators available are not capable of delivering sufficient thrust, and must be supplemented by suitable gearing or other means to obtain the desired results. Such expedients, of course, are not desirable from the standpoint of cost, efficiency, and maintenance, as well as from a production standpoint. Furthermore, valve stems have increased in diameter to the point of impracticability in order to withstand the forces to which they are subjected in such high-pressure service. In consequence of the increased size, the stems are of very low efficiency, as will be obvious.

The present invention overcomes these difficulties by providing for cylinder operation of valves in a novel manner eliminating the valve stem as a major valve-operating element; that is, the valve stem is either eliminated entirely or provided merely as an auxiliary operating means employed only when the effects of the high pressure are absent or minimized to such an extent as practically to prevent any danger of failure. The interior of the valve body defines the cylinder, so that the operating piston working therein may mount the valve closure member substantially directly by reason of the proximity to the valve port. The necessity for a stem on the closure member by which it may be moved is thus avoided, allowing a construction of the closure member for easy opening and closing under high pressures. Preferably, the fluid under pressure controlled by the valve is employed to open or close the valve, although extraneous pressure fluid may be used if desired. A stem may be provided for operation of the valve manually or mechanically in appropriate circumstances.

It is an object of the invention to provide a valve with an internal cylinder operator particularly advantageous for high pressure service.

Another object is the provision of a valve operated by internal cylinder means actuatable by the pressure of fluid controlled by the valve.

Another object is the provision of a valve apparatus utilizing the controlled fluid to operate an internal-cylinder-operated valve incorporated therein.

A further object is the provision of an internal-cylinder-operated valve for operation by pressure fluid with stem means for mechanical operation thereof under particular conditions.

It is also an object of the invention to provide an internal-cylinder-operated valve affordig a simple construction with easy, uncomplicated operation.

Other and further objects, advantages, and features of the invention will become apparent to those skilled in the art from the following detailed description, taken in conjunction with the accompanying drawings, in which.

Figure 1:
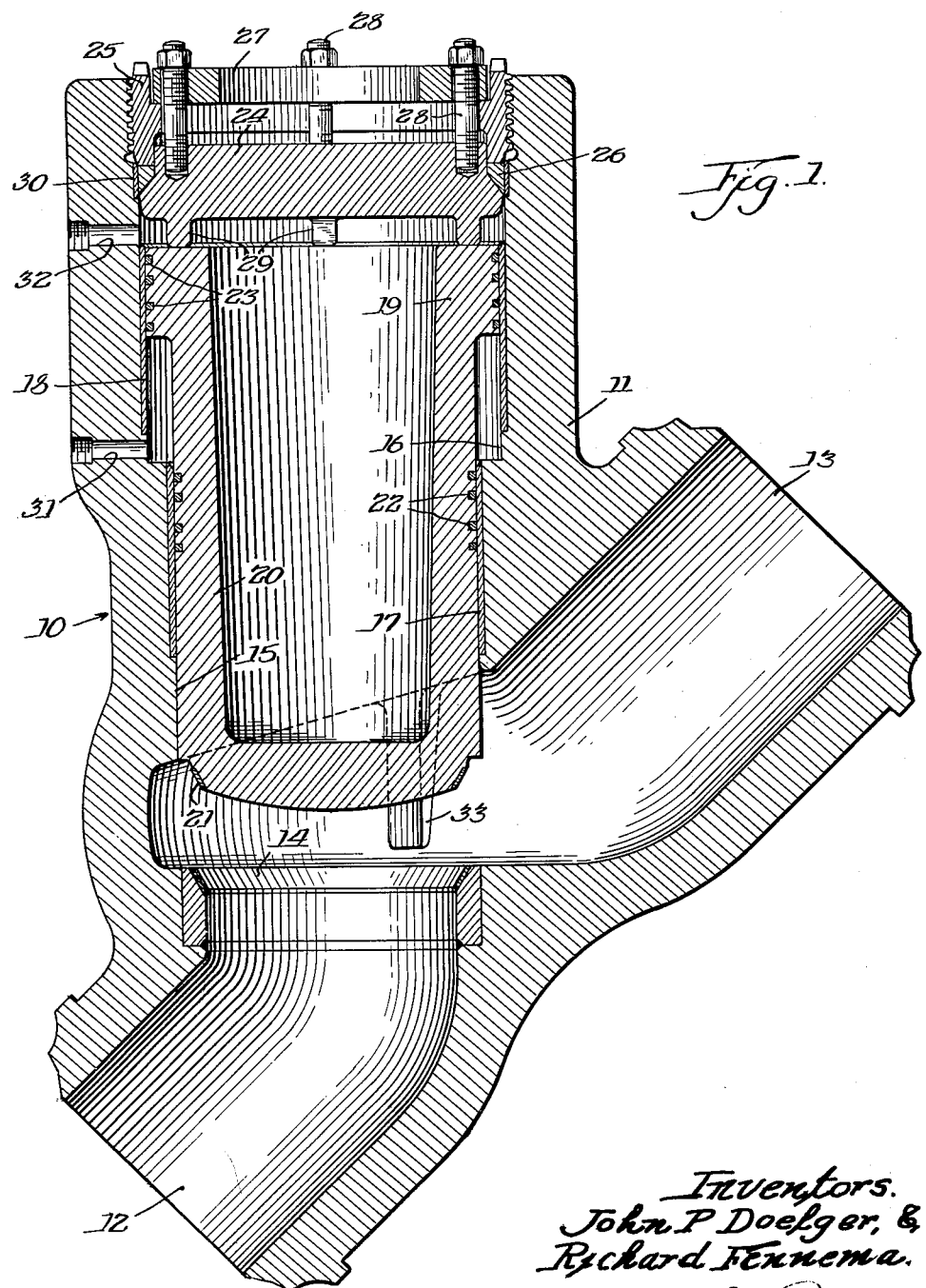
Fig. 1 is a longitudinal sectional view of a valve embodying the invention.

Referring to Fig. 1 of the drawings, there is shown a globe-type valve generally indicated at 10 comprising a valve body 11 having an inlet and outlet 12 and 13 communicating through a flow aperture defined by a valve seat 14. Defined in the body is a bore or passage extending from an end of the body in axial alignment with the seat and intersecting the flow passage through the valve. The bore is stepped, that is, of larger diameter at the portion thereof remote from the seat than at the portion adjacent the seat, to define axially aligned cylinders 15 and 16. The cylinder 15 is of smaller diameter and extends adjacent the seat 14 while the cylinder 16 remote from the seat is of greater diameter. Suitable liners 17 and 18 are provided for each of the cylinders. Working in the cylinder 16 is a piston 19, and working like a piston in the cylinder 15 is a valve closure member 20 which has a seating surface 21 for engagement on the valve seat 14. The piston 19 and closure member 20 are in this instance formed as a single integral member of hollow cupped shape, so that the closure member moves with the piston, although of course these two parts may be otherwise united or connected to move together substantially as a unit. Piston rings 22 and 23 are employed on the member 20 and piston 19 to provide tight seals with the cylinder walls. The effective area of the piston, as will be evident, is greater than that of the closure member, more specifically the outer face of the closure member.

The outer end of the bore in the body may be closed in any suitable manner, in this case by an internal bonnet or cap 24 disposed within the bore, having a reduced outer portion telescoped within a retaining ring 25 which is threaded in the outer end of the bore. A sloping shoulder extends between the reduced portion of the cap and the edge of the larger portion thereof, a sealing ring 26 being disposed between the inner end of the retaining ring 25 and the shoulder of the cap 24. Engaged on an internal shoulder of the retaining ring is a bonnet ring 27. Stud bolts 28 extend from the cap 24 and through the bonnet ring 27 so that the cap may be drawn up by means of nuts on the bolts to apply sealing pressure to the ring 26. Any pressure within the valve body acting on the cap 24 acts to effect additional compression of the sealing ring 26 to provide a tighter seal and prevent escape of the pressure. Suitable lugs 29 are provided on the inner face of the cap 24 to engage the piston 19 and limit the movement thereof in the direction of the cap. A layer 30 of suitable material may be deposited in the body to extend about the seal ring 26. Ports 31 and 32 extend through the wall of the valve body 11 into the larger diameter cylinder 16 respectively adjacent the smaller diameter cylinder 15 and the cap 24, to permit of the introduction and exhaust of fluid under pressure thereinto for operation of the piston 19 to open and close the valve. A plurality of guides 33, of which only one is shown, is provided to hold the closure 20 against radial movement. The operation and control of the valve is explained hereinafter.

Figure 2:
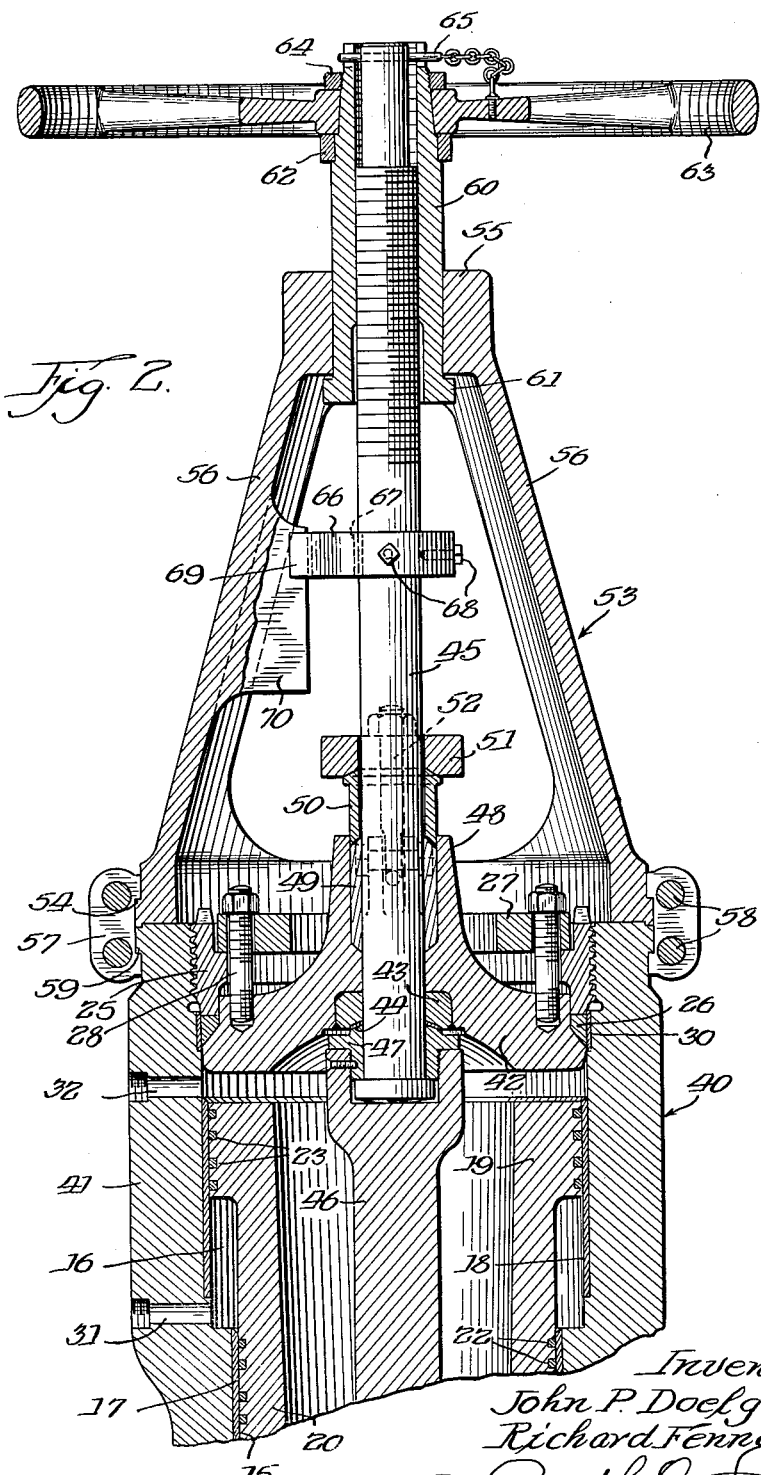
Fig. 2 is a similar view of a similar valve having an auxiliary stem construction.

In Fig. 2, there is shown another embodiment of the invention in which a valve stem is provided to allow manual or mechanical operation of the valve under certain conditions. The valve, generally designated 40, comprises a valve body 41 substantially similar to the body 11 of the valve 10 previously described, differing only slightly therefrom adjacent the open end of the body bore. Accordingly, the body 41 is not shown in its entirety. As shown, the body includes the smaller and larger diameter cylinders 15 and 16 in which work respectively the closure member 20 and the piston 19, the larger diameter cylinder having the ports 31 and 32 opening therefrom as already described. The outer end of the bore by which the cylinders 15 and 16 are defined is closed in this case by a bonnet 42 extending within the bore and having a shoulder to engage the sealing ring 26 disposed between the shoulder and the inner end of the retaining ring 25 threaded within the mouth of the bore, the reduced portion of the bonnet provided by the shoulder telescoping in the retaining ring. The bonnet carries the stud bolts 28 which project through the bonnet ring 27 seated on an internal shoulder of the retaining ring 25 so that the bonnet may be drawn up by threading of nuts on the bolts 28 to apply a predetermined pressure to the sealing ring. At its inner central portion, the bonnet has an insert 43 having a conical back seat 44 of harder material thereon. A bore extends through the bonnet and insert to accommodate a valve stem 45 which has an enlarged inner end for securement to a projection 46 of the closure member 20. The projection 46 may be integral with or otherwise fixed to the member 20, and extends axially to adjacent the outer end of the piston 19. A recess in the free end receives the enlarged end of the stem 45, which is secured by the disc stem ring 47 threaded into the recess of the projection 46 and having a conical face adapted to engage on the back seat 44. The bonnet has a stuffing box 48 formed on its outer face in which packing 49 is compressible by a gland 50 movable adjustably inwardly of the stuffing box by means of a suitable follower 51 operable by means of bolts such as 52 pivotally mounted on the stuffing box 48, all in a manner well known in the art.

Mounted on the valve body is a valve yoke generally indicated 53 having a base ring with a shoulder 54 formed thereon, and a connecting portion 55, a plurality of yoke arms 56 extending between the base ring and connecting portion. The yoke 53 is secured to the valve body 41 by means of a split clamping ring 57 tightened by bolts 58, the clamping ring engaging the base ring shoulder 54 and a shoulder 59 formed about the adjacent end of the body 41. This shoulder 59 represents the only difference between the valve bodies 11 and 41. The connecting portion 55 of the yoke is apertured to receive therethrough the valve stem 45 and an internally threaded yoke sleeve 60. The valve stem projects through the bonnet gland and gland follower and has its outer portion threaded for threaded engagement with the yoke sleeve 60 which is slidable in the yoke connecting portion 55. The sliding movement of the sleeve 60 is limited by a flange 61 on its end inwardly of the yoke, and an abutment ring 62 engaged on the sleeve adjacent the outer end, the yoke sleeve projecting outwardly of the ring 62. A handwheel 63 is secured on the outer end of the yoke sleeve, as by receiving a hexagonal or other non-circular portion of the yoke sleeve in a corresponding aperture in the wheel hub, with a securing nut 64 threaded over the end of the yoke sleeve against the hub. The handwheel and the sleeve may be releasably held against rotation on the stem 45 in any suitable manner, as by means of a pin 65 extending through end slots on the sleeve and a transverse bore in the valve stem. The valve stem is held against rotation by means of a holding member 66 secured thereon as by means of a key 67 and set screws 68 at a point intermediate the sleeve 60 and the packing gland follower 51. The holding member 66 has a forked or slotted end portion 69 engaging over the edge of a vertical guide member 70 projecting from one of the yoke arms 56.

It will be evident that in movement of the piston 19 and closure member 20 in either direction by means of pressure fluid introduced and exhausted through the ports 31 and 32, the stem 45 will move therewith, being slidable in the yoke connecting portion 55 by reason of the sliding yoke sleeve 60. The distance between the flange 61 and abutment ring 62 of the sleeve is slightly greater than the stroke of the piston plus the thickness of the yoke portion 55, so that normally the movement of the piston and closure will not result in engagement of either the flange or the ring against the yoke portion 55. When it is desired to operate the valve by means of the handwheel 63, the pin 65 is withdrawn from its locking position and the handwheel rotated to turn the sleeve 60, thereby moving the sleeve in one direction or another along the valve stem. If the valve is to be closed from the fully open position as shown in Fig. 2, the wheel 63 is rotated to bring the flange 61 on the inner end of the sleeve 60 into engagement with the inner face of the connecting portion 55. Continued rotation of the handwheel in the same direction then results in threading of the stem out of the sleeve toward the valve seat 14 until the closure 20 tightly engages on the valve seat. To open the valve by means of the handwheel, the wheel is turned in the opposite direction to move the valve sleeve along the stem in the direction of the valve seat until the outer surface of the connecting portion 55 is engaged by the abutment ring 62. Continued rotation of the handwheel then results in drawing the stem 45 outwardly, thus moving the closure member 20 off the seat until the conical projection on the disc stem ring 47 engages on the back seat 44, as shown in Fig. 2. It will be seen that the disc stem ring 47 is so located as to limit movement of the piston from the valve seat to a position leaving the port 32 open. Engagement of the conical face of stem ring 47 on the back seat 44 provides a seal supplementing the packing 49 in the stuffing box 48, and also serves to limit opening movement of the piston. It will be obvious that instead of employing the handwheel 63 to operate the valve through the stem, an electrical motor or other mechanical means may be employed to rotate the yoke sleeve 60. It will be appreciated, of course, that the arrangement of the yoke sleeve 60 and stem 45 may be varied from that illustrated while retaining the same operational result. For example, the sleeve may be held against turning movement in the yoke portion 55, but left slidable therein, and the stem allowed rotative movement, the handwheel 63 being mounted on the outer end of the stem.

Figure 3:
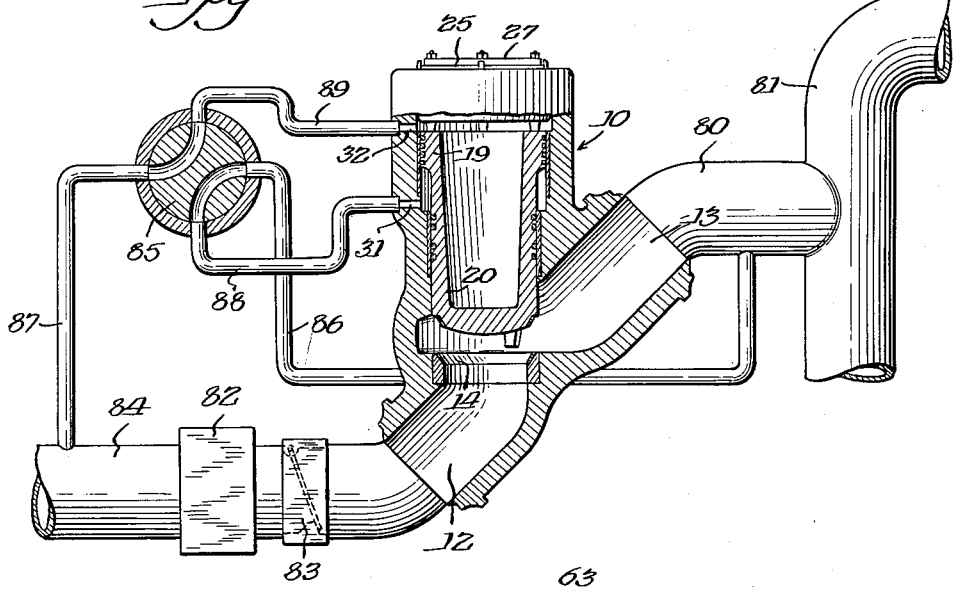
Fig. 3 is a diagrammatic view of the valve of Fig. 1 employed in a system or appartus for controlling fluid under high pressure.
Figure 4:
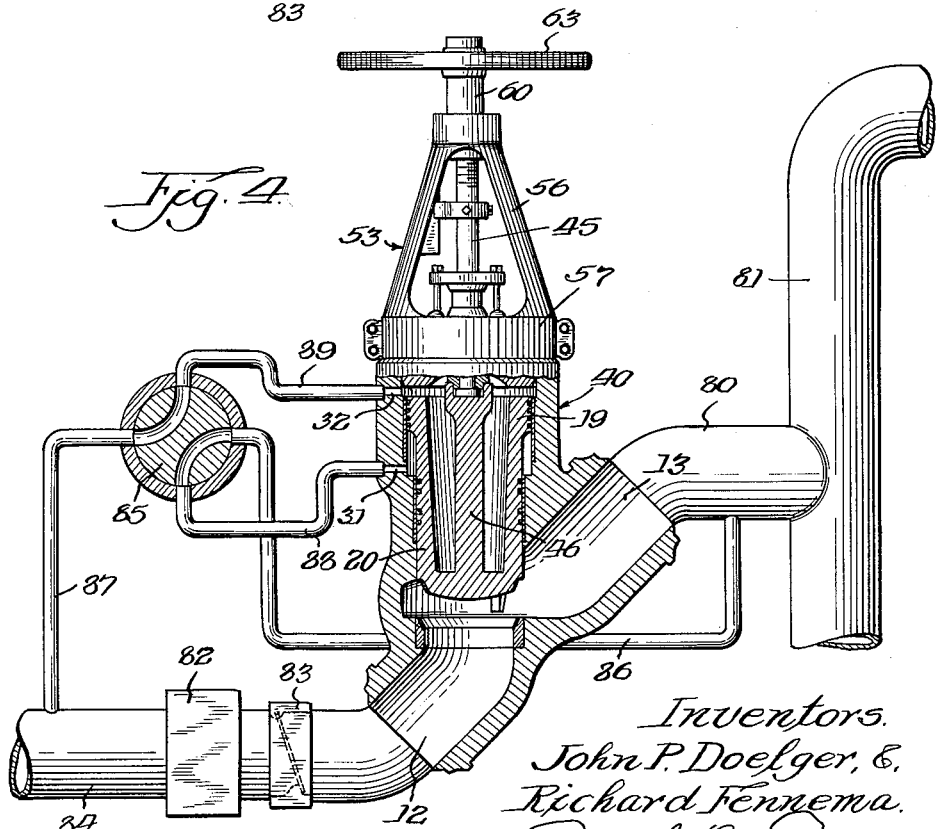
Fig. 4 is a similar diagrammatic view showing the valve of Fig. 2 employed in such a system or apparatus.

Figs. 3 and 4 illustrate the incorporation of the valve 10 and the valve 40, respectively, in a fluid system controlled thereby and through which the valve is operated. In Fig. 3, the valve 10 is shown as controlling flow through a line 80 which may be connected to another line 81, such as a boiler feed water header. The line 80 communicates through the valve with a pump 82 adapted to supply fluid under pressure through the inlet of the valve to pass through the seat 14 to the line 80 and thence to the line 81. A check valve 83 is preferably provided between the inlet of the valve 10 and the pump to prevent subjection of the pump to back pressure. A line 84 conveys the fluid to the intake side of the pump 82. A four-way valve 85, which may be other valve means suitable for the same purpose, is interposed between a supply line 86 which extends from the line 80 to the valve 85 and an exhaust line 87 which extends from the valve 85 to the line 84 or other low pressure zone. A line 88 extends from the port 31 of the larger diameter cylinder 16 of the valve 10 to the valve 85, and a similar line 89 extends from the other port 32 of the cylinder 16 to the valve 85. With the valve 85 in the position shown, the line 80 is connected through the line 86, valve 85 and line 88 with the port 31 to supply pressure to one side of the piston 19, while the cylinder 16 at the other side of the piston is exhausted through the line 89, valve 85, and line 87 to the low pressure zone, so that the piston is moved to and maintained in a position holding the closure member 20 off the seat 14. When it is desired to close the valve 10, the valve 85 is operated to connect the line 88 to the exhaust line 87 and the line 86 to the line 89, so that the pressure in the line 80 acts, by reason of the different areas of the piston 19 and closure member 20, to move the piston toward the valve seat 14 to bring the closure member into closing relation on the seat. To open the valve, with the fluid in line 80 under appropriate pressure, the valve 85 is operated to connect line 86 to port 31, and the port 32 to exhaust line 87, the fluid in line 80 then acting on both the piston and the closure member to move the latter from the seat 14. Conventional means, not shown, such as throttle valves, may be provided if desired for controlling the speed of movement of the piston and closure member.

Should the pressure in the line 80 drop to a level below that in the low pressure zone to which the exhaust line 87 is connected, as by stopping of the pump 82 with no other pump means or pressure means acting on the fluid in line 80 through the header or line 81, the valve will be closed by the pressure of the low pressure fluid acting through the line 87, valve 85 and line 89 to move the piston and closure member toward the seat against the lower pressure of the fluid in the line 80. Of course, upon the beginning of a drop in pressure in the line 80, the valve 85 may be operated to employ the remaining pressure to close the valve 10 in the manner already explained, before the pressure of the fluid in line 80 falls below the exhaust pressure. With the valve closed, assuming there is no pressure in the line 80 and that the pump 82 is not operating, the valve may be opened by starting the pump 82 so that the pressure developed thereby will act against the closure member 20 to raise it off the seat 14 with the valve 85 in the position shown, so that the action of the pump pressure on the closure member will be augmented by the pressure built up in the line 80 and acting upon the piston 19 in the manner already explained.

The operation of the valve 40 in the system illustrated and described is the same as that of the valve 10 when the stem 45 and handwheel 63 or other mechanical operating means are not to be employed. With the valve closed, however, and no pressure generated by the pump 82 or in the line 80, the stem may be employed through the handwheel 63 or other means to open the valve in the manner already described, and similarly to close the valve under the same conditions of no pressure in the line 80 with the pump 82 inoperative. It should be clear, of course, that the stem may be used in this manner even if there is some pressure acting upon the valve 40 so long as the pressure is not so great that it might result in damage to the valve stem or associated parts. The valve 40 may also be used for throttling flow through the line 80 by closing the valve to the desired partially closed position by operation of the stem as described for full closing, merely stopping short of the fully closed position, while the valve is subjected only to a pressure within the capacity of the valve stem. The stem may also be employed to place the valve in a throttling position under the normal high pressure of the system by employing the valve 85 to apply the pressure to close the valve, and then by means of the valve stem 45 and the handwheel or other means backing the closure off the seat the desired distance, in the same manner as when opening the valve completely.

The yoke sleeve 60 and stem 45 provide means by which the valve may be locked in open or closed position when desired, by moving the sleeve on the stem after the closure member has been brought to the desired position. The valve may be locked in the open position of Fig. 2, for example, by rotating the sleeve 60 so that it is moved along the stem until the abutment ring 62 bears on the yoke portion 55, the stem thus being held against movement toward the valve seat so as to resist closing movement of the piston and closure member. Similarly, with the valve closed, the sleeve may be moved outwardly on the stem to engage the flange 61 against the portion 55 and thus prevent opening of the valve.

It will be appreciated that instead of employing the pressure of the fluid in the line or system controlled by the valve 10 or 40 to operate the valve, an external source of pressure fluid may be employed if desired, so long as a sufficiently high level of pressure is obtainable to operate the valve against the pressure in the line.

The invention is not limited to the specific embodiments thereof illustrated and described herein, but may be embodied in other forms varying from those disclosed without departing from the scope of the invention, and accordingly it is not intended that the invention be limited except as required by the appended claims.

We claim:

1. Valve apparatus comprising a valve having a body with a pair of coaxial cylinders of differing diameters defined therein, a valve seat adjacent the end of the cylinder of smaller diameter remote from the larger-diameter cylinder, a piston working in the larger-diameter cylinder, a piston-like valve closure member movable with said piston and working in the smaller-diameter cylinder engageable with said seat to close the valve, pump means having the pressure side thereof connected to the valve, a fluid line in communication through the valve seat with the pressure side of said pump means, the said fluid line also being in communication with a source of fluid pressure, a pair of conduits communicating with the larger-diameter cylinder at opposite sides of the piston, a fluid supply line extending from said fluid line selectively communicable with said conduits, an exhaust line extending from the intake side of the pump means and communicable selectively with said conduits, and valve means operable for selectively connecting the fluid supply line to one of said conduits while connecting the exhaust line to the other of said conduits.

2. Valve apparatus comprising a valve having a body with a pair of substantially coaxial cylinders of different effective areas defined therein, a valve seat adjacent that end of the smaller-area cylinder remote from the larger-area cylinder, a free piston working in the larger-area cylinder, a valve closure member movable with said piston working in the smaller-area cylinder for opening and closing said valve seat, a fluid line communicating with the valve seat, said fluid line also communicating with a fluid pressure source, pump means having the pressure side thereof communicating through the valve seat with said fluid line, conduit means connecting the larger-area cylinder at opposite sides of the piston with the fluid line and the suction side of said pump means, and valve means controlling flow of fluid through said conduit means for selectively admitting piston-actuating fluid from the fluid line to the larger-area cylinder at one side of the piston while exhausting the other side to said pump means suction side.

3. Valve apparatus comprising a valve having a body with a pair of substantially coaxial cylinders of different effective areas defined therein, a valve seat in the body adjacent the end of the smaller-area cylinder remote from the larger-area cylinder, a piston working in the larger-area cylinder, a valve closure member movable with said piston and working in the smaller-area cylinder for opening and closing said valve seat, a fluid line communicating with the valve seat, pump means having the pressure side thereof communicating with said fluid line through the valve seat, the said fluid line communicating with a fluid pressure source, conduit means connecting the larger-area cylinder at opposite faces of the piston with the fluid line and the suction side of said pump means, valve means controlling said conduit means for selectively admitting piston-actuating fluid from the fluid line to one face while exhausting from the other face to said suction side, a valve stem connected to the piston, support means on the body, slidable means carried by said support means receiving said stem, and means for moving the stem and slidable means axially relative to each other.

4. Valve apparatus comprising a valve having a body with a pair of coaxial cylinders of different effective areas defined therein, a valve seat adjacent the end of the cylinder of smaller area remote from the larger-area cylinder, a piston working in the larger-area cylinder, a valve closure member movable with said piston working in the smaller-area cylinder for closing and opening said valve seat, pump means having the pressure side thereof communicating with the valve seat, a fluid line communicating through the seat with the pressure side of said pump means, the said fluid line also communicating with a fluid source having fluid pressure sufficiently high to operate the said valve closure member against the pressure in the pipeline in which said valve is installed, conduit means communicating with the larger-area cylinder at opposite sides of the piston, supply and exhaust conduits communicating respectively with said fluid line and the suction side of the pump means, and valve means for placing the conduit means in communication with said supply and exhaust lines operable for selectively opening one side of the larger-area cylinder to the supply line while opening the other side thereof to the exhaust line.

References Cited in the file of this patent

UNITED STATES PATENTS

| | | |
|---|---|---|
| 2,154,955 | Mueller | Apr. 18, 1939 |
| 2,585,556 | Johnson | Feb. 12, 1952 |
| 2,630,829 | Shafer | Mar. 10, 1953 |
| 2,676,611 | Page | Apr. 27, 1954 |
| 2,708,452 | Tappan | May 17, 1955 |
| 2,781,035 | Loecy | Feb. 12, 1957 |

FOREIGN PATENTS

| | | |
|---|---|---|
| 221,809 | Great Britain | of 1926 |
| 719,992 | France | of 1931 |